Aug. 1, 1939.    L. C. SHELTON ET AL    2,167,729
PASTRY PAN
Filed Oct. 8, 1937    2 Sheets-Sheet 1

INVENTOR
Lillian C. Shelton
BY Marion E. Rodgers
Donald W. Robertson
ATTORNEY

Aug. 1, 1939. L. C. SHELTON ET AL 2,167,729
PASTRY PAN
Filed Oct. 8, 1937 2 Sheets-Sheet 2
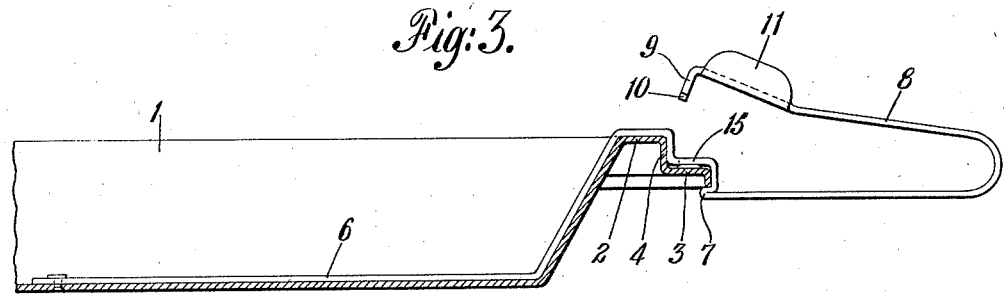
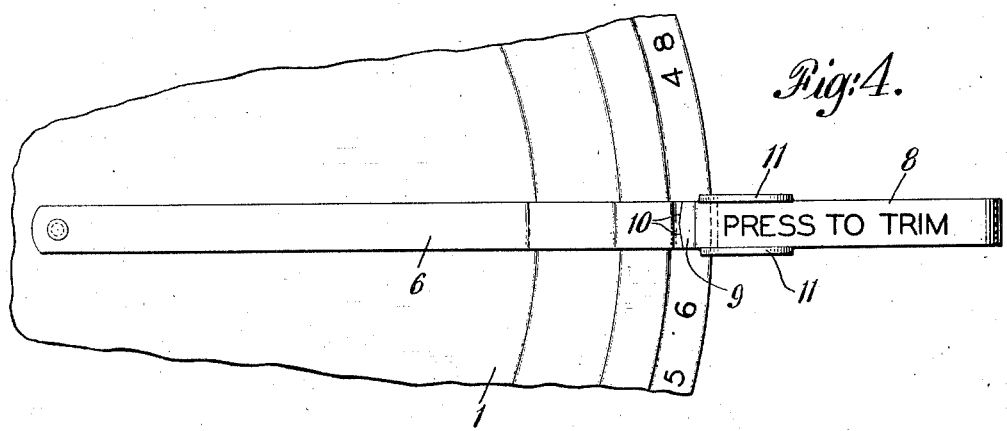
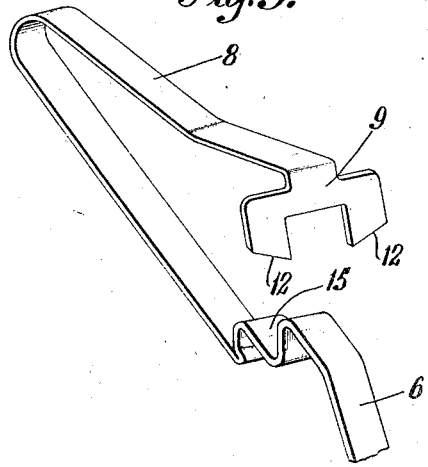
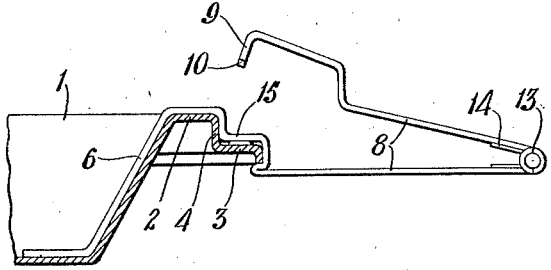
INVENTOR
Lillian C. Shelton
BY Marion C. Rodgers
Donald W. Robertson
ATTORNEY Patented Aug. 1, 1939

2,167,729

UNITED STATES PATENT OFFICE 2,167,729

PASTRY PAN

Lillian C. Shelton and Marion E. Rodgers, New York, N. Y.

Application October 8, 1937, Serial No. 167,915

12 Claims. (Cl. 53—6)

The invention relates to pie pans and similar pans for the cooking of pastries and the like. More particularly it relates to the rim construction of such pans and to loosening and cutting devices cooperating with such rim construction.

Efforts have been directed in the past to the construction of pie pans and plates provided with means enabling the user to readily divide the pastry into any desired number of equal parts. It has been proposed, for example, to place indicia upon the rim portion of a pieplate comprising several series of numerals indicating the various fractional parts of the circumference. This expedient is quite impracticable because the piecrust extends over the rim, obscuring the indicia and thus impairing its utility. In order to overcome this disadvantage attention subsequently was directed to the use of guides, gauges or cutters adapted to be applied to the finished pastry and which constitute elements entirely separate from the pan in which the pastry is baked. It is an object of the present invention to combine, in a single device, a pan for cooking a pastry and a gauge for dividing it into equal parts and yet which will overcome the difficulty above mentioned.

A further object is to provide a pastry pan having a double rim portion or a rim with a downwardly offset portion having indicia thereon for dividing it into a series of equal parts.

A more specific object is to provide a pan of this type on which there is a trimming element cooperating with the offset rim portion for severing that portion of the pastry which may extend over the indicia. A further specific object is to provide a combination pan, pie loosening knife and trimming knife. Further objects and advantages will appear as the description proceeds.

In the drawings:

Fig. 3 is a fragmentary transverse section, to an enlarged scale, of a pan similar to that shown in Figs. 1 and 2 and showing our combined pie loosener and trimmer applied thereto. Fig. 4 is a fragmentary top plan view of the structure shown in Fig. 3.

Fig. 5 is a fragmentary perspective view of a modified form of trimmer; and Fig. 6 is an elevational view of another modification of the trimmer.

Figure 1:
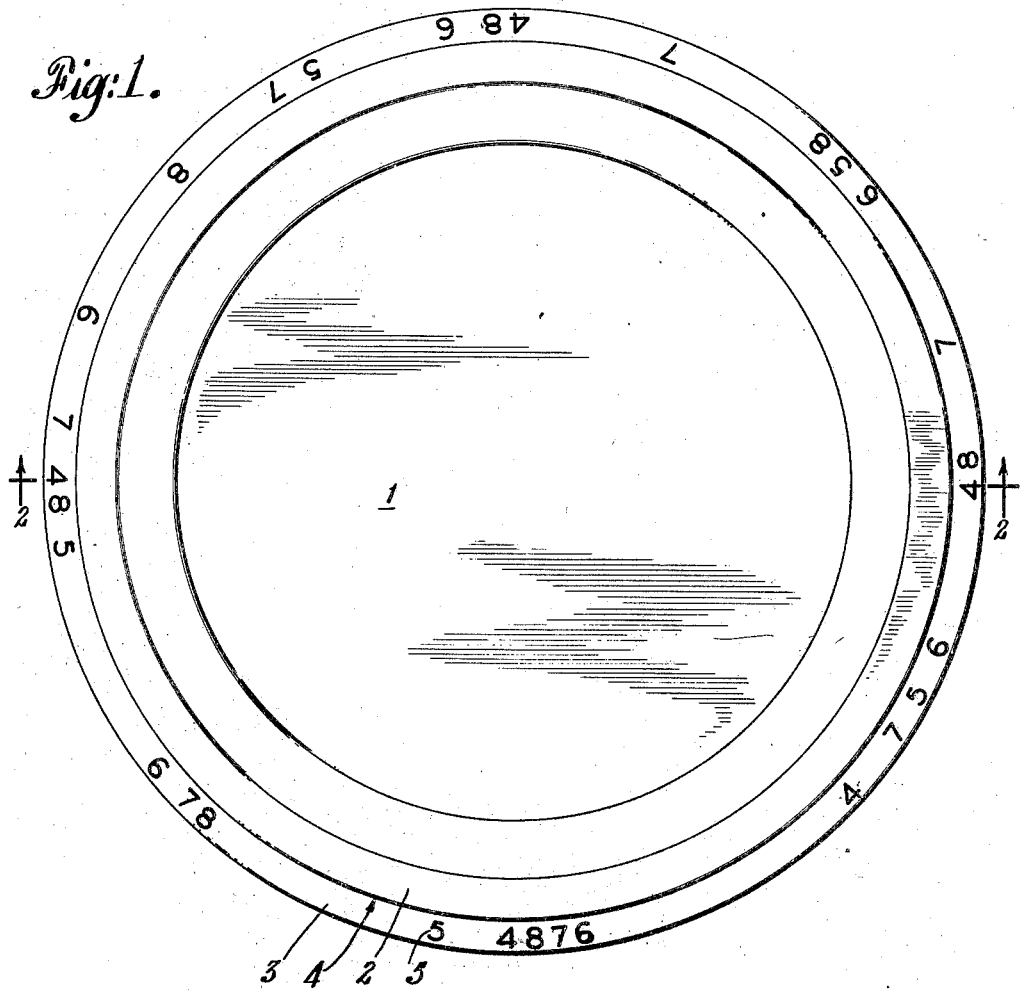
Fig. 1 is a top plan view of a pan embodying our invention.
Figure 2:
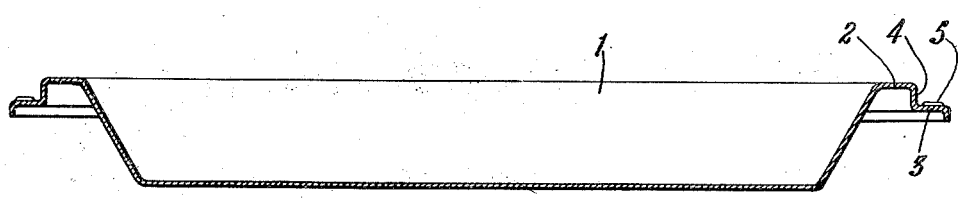
Fig. 2 is a transverse section of the pan shown in Fig. 1.

Referring to Figs. 1 and 2 there is shown a pie pan comprising a body 1 and a rim portion 2 extending laterally outwardly therefrom. The rim portion 2 is provided with a downwardly offset outer edge 3 joined to the rim portion 2 by the downwardly extending cylindrical portion 4. The upper surface of the downwardly offset portion 3 is provided with numerical indicia 5 which preferably are raised above the surface of the flange 3 as shown in Fig. 2. This prevents these indicia from being obliterated or obscured by pastry accumulations.

Referring now to Figs. 3 and 4, there is shown a knife or spatula 6 for loosening the pastry from the bottom, sides and rim portions of the pan. This loosening member 6 conforms with the shape of the pan and rim portions thereof including the downwardly offset portion 3. It may also extend underneath the edge of the flange 3 as at 7 so as to maintain its proper relationship to the pan. The loosening member 6 is provided with an extension 8 which is generally U-shaped in form and which terminates in a downwardly projecting knife element 9. The blade of the knife element 9 is V-shaped, as shown at 10 in Fig. 4, to adapt it for trimming upon rotation of member 6 in either direction. If desired, the extension 8 may be provided with flanges as at 11 to serve as a handle in the operation of trimming the edge of the pastry. The extension 8 preferably is made of spring steel or other resilient material to hold the knife element 9 normally in the raised position shown in Fig. 3 so that the pastry dough can be placed in the pan without interference while permitting it to be pressed down into engagement with the downwardly offset outer edge 3 for trimming.

In the embodiment shown in Fig. 5 the knife element 9 is provided with separate blades 12, which are spaced apart sufficiently to clear the portion 15 of the member 6 which lies adjacent the offset outer edge 3 thereby permitting the blades 12 to be pressed down into direct engagement with the rim of the pan. Another modification is illustrated in Fig. 6, wherein the extension 8 is formed as two separate members hinged together at 13. The hinge connection at 13 may comprise a spring 14 arranged to maintain the knife element normally in spaced relationship to the rim of the pan while permitting it to be pressed downwardly into engagement therewith as desired.

In using the pan shown in Figs. 1 and 2 the piecrust is laid in the pan and pressed into conformity therewith over both the body and rim portions. If proper care is used it is possible to avoid having the pastry come in contact with the offset outer edge 3 where it would obliterate the marking indicia. If, however, the pastry does come down over the offset portion of the rim, the vertical cylindrical portion 4 serves as a guide about which a knife may be run to sever the portion of the pastry which lies over the indicia.

In using a pan of any of the forms shown in Figs. 3 to 6 inclusive, the piecrust dough is laid in place in the usual manner and the user then presses down on the upper part of the extension 8, bringing the knife element 9 down against the offset rim portion 3, and slides the knife completely around the edge of the pan in either direction. The portion of the member 6 which lies adjacent to the offset portion 3 (indicated at 15 in Figs. 3 and 6) serves to remove the severed portion of the dough. It will be apparent that the trimming operation can be performed either before or after the pastry is baked.

It will be seen that by our invention we have provided a pan which is simple and inexpensive to fabricate, comprising a gauge and means for trimming the dough or pastry from that portion of the pan which constitutes the gauge. We have also provided a pan of this type with which there are combined a gauge, a loosener and a trimmer.

The terms and expressions which we have used are employed as terms of description and not of limitation and we have no intention by the use of such terms and expressions of excluding any equivalents of the devices shown and described.

What we claim is:

1. A pastry pan comprising a body having a rim portion extending laterally outwardly therefrom, a loosening member pivotally secured to the center of the body and shaped to conform to the bottom thereof, said rim portion being provided with indicia dividing the circumference of the pan into fractional parts, and trimming means associated with said loosening member for severing that portion of a pastry which lies over said indicia.

2. A pastry pan comprising a body having a rim portion extending laterally outwardly therefrom, said rim portion being provided with indicia dividing the circumference of the pan into fractional parts, and trimming means slidably mounted on the pan and cooperating with said rim portion of the body for severing that portion of a pastry which lies over said indicia.

3. A pastry pan comprising a body having a rim portion extending laterally outwardly therefrom, said rim portion having a downwardly offset outer edge the upper surface of which is provided with indicia dividing the circumference of the pan into fractional parts, and trimming means slidably mounted on the pan and cooperating with said rim portion of the body for severing that portion of a pastry which lies over said indicia.

4. A pastry pan comprising a body having a rim portion extending laterally outwardly therefrom, said rim portion having a downwardly offset outer edge the upper surface of which is provided with indicia dividing the circumference of the pan into fractional parts, a trimmer slidably mounted on the pan and comprising a knife cooperating with said rim portion of the body for severing that portion of a pastry which lies over said indicia, and means associated with said knife for normally holding it away from said rim portion.

5. A pastry pan comprising a body having a rim portion extending laterally outwardly therefrom, said rim portion having a downwardly offset outer edge the upper surface of which is provided with indicia dividing the circumference of the pan into fractional parts, a trimmer rotatably mounted on the pan and comprising a knife cooperating with said rim portion of the body for severing that portion of a pastry which lies over said indicia, and resilient means associated with said knife for normally holding it away from said rim portion.

6. A pastry pan comprising a body having a rim portion extending laterally outwardly therefrom, said rim portion having a downwardly offset outer edge the upper surface of which is provided with indicia dividing the circumference of the pan into fractional parts, and trimming means cooperating with said rim portion comprising a knife arranged to bear against said downwardly offset outer edge and to slide around the circumference of the pan to sever that portion of a pastry which lies over said indicia.

7. A pastry pan comprising a body having a rim portion extending laterally outwardly therefrom, said rim portion having a downwardly offset outer edge the upper surface of which is provided with indicia dividing the circumference of the pan into fractional parts, a loosening member pivotally secured to the center of the body and shaped to conform to the bottom and rim portions thereof, and trimming means associated with said loosening member, said trimming means comprising a knife cooperating with that portion of said loosening member which conforms to said rim portion for severing and removing that portion of a pastry which lies over said indicia.

8. A pastry pan comprising a body having a rim portion extending laterally outwardly therefrom, said rim portion having a downwardly offset outer edge the upper surface of which is provided with indicia dividing the circumference of the pan into fractional parts, a loosening member pivotally secured to the center of the body and shaped to conform to the bottom and rim portion thereof, and a trimmer associated with said loosening member for severing that portion of a pastry which lies over said indicia.

9. A pastry pan comprising a body having a rim portion extending laterally outwardly therefrom, said rim portion having a downwardly offset outer edge the upper surface of which is provided with indicia dividing the circumference of the pan into fractional parts, a loosening member pivotally secured to the center of the body and shaped to conform to the bottom and rim portion thereof, and a trimmer associated with said loosening member for severing that portion of a pastry which lies over said indicia, said trimmer comprising a knife resiliently supported above that portion of said loosening member which conforms with said rim portion and arranged to be brought into engagement with said rim portion at one side of said loosening member to cooperate therewith in severing and removing that portion of a pastry which lies over said indicia.

10. A pastry pan comprising a body having a rim portion extending laterally outwardly therefrom, said rim portion having a downwardly offset outer edge the upper surface of which is provided with indicia dividing the circumference of the pan into fractional parts, a loosening member pivotally secured to the center of the body and shaped to conform to the bottom and rim portion thereof, and a trimmer integrally secured to said loosening member for severing that portion of a pastry which lies over said indicia, said trimmer comprising a knife having a pair of blades resiliently supported in spaced relation to said rim portion and arranged to be brought down against said rim portion with one blade at each side of said loosening member.

11. A pastry pan comprising a body having a rim portion extending laterally outwardly, then downwardly and outwardly therefrom, said last named outwardly-extending portion having indicia formed on the upper surface thereof dividing the circumference of the pan into fractional parts, said downwardly-extending portion of the rim being substantially cylindrical, and trimming means slidably mounted on the pan and comprising a knife cooperating with the cylindrical portion of the rim for severing that portion of a pastry which lies over said indicia.

12. A pastry pan comprising a body having a rim portion extending laterally outwardly to support the edge of the pastry, then downwardly to form a circumferential guide for trimming the pastry, said rim portion also having a planar portion projecting horizontally outwardly from the lower extremity of the circumferential guide, said projecting portion having indicia formed on the upper surface thereof beyond the edge of the circumferential guide dividing the circumference of the pan into fractional parts.

LILLIAN C. SHELTON.
MARION E. RODGERS.